United States Patent
Hagvall et al.

(10) Patent No.: US 12,541,001 B2
(45) Date of Patent: Feb. 3, 2026

(54) METHOD FOR DETERMINING AN ERROR WITH ANCHOR POINT DETECTION FOR AN AT LEAST PARTLY AUTONOMOUS VEHICLE

(71) Applicant: Volvo Autonomous Solutions AB, Gothenburg (SE)

(72) Inventors: Linus Hagvall, Gothenburg (SE); Stefan Bergquist, Gothenburg (SE)

(73) Assignee: Volvo Autonomous Solutions AB, Gothenburg (SE)

(*) Notice: Subject to any disclaimer, the term of this patent is extended or adjusted under 35 U.S.C. 154(b) by 327 days.

(21) Appl. No.: 18/326,568

(22) Filed: May 31, 2023

(65) Prior Publication Data

US 2023/0393231 A1     Dec. 7, 2023

(30) Foreign Application Priority Data

Jun. 1, 2022    (EP) ..................................... 22176733

(51) Int. Cl.
*G01S 5/02*          (2010.01)
*G01C 21/28*      (2006.01)

(52) U.S. Cl.
CPC ........ *G01S 5/0244* (2020.05); *G01S 5/02695* (2020.05); *G01C 21/28* (2013.01); *G01S 2205/01* (2020.05)

(58) Field of Classification Search
CPC ............... G01S 5/0244; G01S 5/02695; G01S 2205/01; G05D 1/028; B60W 2050/046; B60W 2556/50
See application file for complete search history.

(56) References Cited

U.S. PATENT DOCUMENTS

| | | | | |
|---|---|---|---|---|
| 2016/0023649 | A1* | 1/2016 | Muller | ............. B60W 50/0097 701/22 |
| 2016/0332624 | A1* | 11/2016 | Tezuka | .................. B60W 30/16 |
| 2017/0347624 | A1 | 12/2017 | Jorgensen et al. | |

FOREIGN PATENT DOCUMENTS

| | | | |
|---|---|---|---|
| CN | 112833897 A | 5/2021 | |
| WO | WO-2015108066 A1 * | 7/2015 | ............. G01C 21/20 |

OTHER PUBLICATIONS

G. L. Squires, Practical Physics, 3rd edition, Cambridge University Press, p. 7-31 (Year: 1985).*

(Continued)

*Primary Examiner* — Robert W Hodge
*Assistant Examiner* — Fred H Mull
(74) *Attorney, Agent, or Firm* — Jeffri A. Kaminski; Venable LLP

(57) ABSTRACT

A method for determining an error with anchor point detection for an at least partly autonomous vehicle is provided. The method comprises detecting a first anchor point. The method comprises obtaining a distance between the first anchor point and a second anchor point. The method comprises, based on the distance and a of the vehicle, estimating an expected time for the vehicle to detect the second anchor point. The method comprises establishing a time difference by comparing the expected time with a second time after the expected time or by detecting the second anchor point at a third time, and establishing the time difference by comparing the expected time with the third time. The method comprises, based on the established time difference, determining whether there is an error in detecting the first anchor point and/or the second anchor point.

13 Claims, 5 Drawing Sheets

(56) References Cited

OTHER PUBLICATIONS

Extended European Search Report in corresponding European Application No. 22176733.8 dated Dec. 8, 2022 (10 pages).

* cited by examiner

METHOD FOR DETERMINING AN ERROR WITH ANCHOR POINT DETECTION FOR AN AT LEAST PARTLY AUTONOMOUS VEHICLE

TECHNICAL FIELD

The invention relates to a method for determining an error with anchor point detection for an at least partly autonomous vehicle. The invention further relates to a control unit, a vehicle, a computer program, and a computer program product.

The invention can be applied in any vehicles controlled at least partially autonomously, such as cars, heavy-duty vehicles, trucks, buses, marine vessels, and construction equipment.

BACKGROUND

When automating a vehicle, it is of great importance to be able to decide the vehicles position. For example, the position is essential to navigate the vehicle and to make sure that the vehicle is safe.

There are many ways that positioning of a vehicle can be done today. One common method is positioning using a Global navigation satellite system (GNSS) such as e.g. Global Positioning System (GPS). Another common method is the use of matching a Light Detection and Ranging (Lidar) point-cloud reading to a pre-recorded map, also referred to as scan matching.

For autonomous vehicles, it is necessary to have high reliability to perform tasks while maintaining general safety conditions. Hence, several positioning methods may be used in combination to achieve higher reliability when positioning autonomous vehicles. For example, GNSS may be used in combination with Lidar. When GNSS is not available, e.g. while operating indoors or in mountainous areas, Lidar may be used in combination with cameras, dead reckoning techniques, etc.

Even if positioning methods are combined, it is often not possible to deduce whether the positioning is reliable enough to perform certain tasks. This is since each used positioning method must be shown to have high reliability on its own, otherwise it is not a good reference to compare with other positioning methods. Moreover, the positioning methods typically need to be independent, meaning that they cannot have a common cause of failure. For example, a Lidar and a camera may both get similar problems in dark and rainy weather meaning that there are situations where both sources will fail to work reliably, causing an autonomous vehicle to not be able to establish its position properly. Therefore in some conditions the use of only a Lidar and a camera does not produce sufficient reliability.

Another way of determining a position of a vehicle is with the use of anchor points. An anchor point as used herein may be some detectable feature which is coupled with a predetermined position, i.e. when detecting the detectable feature, the predetermined position may be obtained. For example, anchor points may comprise at least one visual marker, e.g. a Quick Response (QR) code, and/or at least one Radio Frequency (RF) tag to be detected by the vehicle, which at least one visual marker and/or at least one RF tag identifies the predetermined position of a respective anchor point. In this way, using an anchor point it is possible to determine a position of a vehicle independently from the other mentioned positioning methods. However, since vehicles drive pass an anchor point quickly, accuracy of a determined position will be low, and furthermore, a detection process of anchor points may be slow and may be subject to faults, e.g. showing old anchor points. This means that it is not reliable that the predetermined position of the detected anchor point is a correct current position of the vehicle as it may be outdated or refer to a wrong position.

Hence, there is an ongoing strive to improve positioning reliability of autonomous vehicles.

SUMMARY

An object of the invention is to improve reliability of positioning an at least partly autonomous vehicle.

Hence, there is provided a method for determining an error with anchor point detection for a vehicle. The vehicle is at least partly autonomous. The method comprises:
  detecting a first anchor point at a first time;
  obtaining a distance between the first anchor point and a second anchor point;
  obtaining a speed indication, wherein the speed indication indicates an actual speed and/or an expected speed of the vehicle between the first anchor point and the second anchor point;
  based on the obtained distance and using the indicated actual speed and/or expected speed, estimating an expected time for the vehicle to detect the second anchor point;
  establishing a time difference by any one out of:
    at a second time after the expected time, establishing the time difference by comparing the expected time with the second time, or
    detecting the second anchor point at a third time, and establishing the time difference by comparing the expected time with the third time; and
  based on the established time difference, determining whether there is an error in detecting the first anchor point and/or the second anchor point.

Since obtaining the distance between the first anchor point and a second anchor point and obtaining a speed indication, it is possible to accurately, e.g. using standard arithmetic operations for distance and speed, estimate the expected time for when the vehicle is supposed to detect the second anchor point.

Since the time difference is established, it is possible to determine whether there is an error in detecting the first anchor point and/or the second anchor point. This is since if the timing for detecting the first anchor point and the second anchor point differs from the expected time, it may be concluded that there may be an error with anchor point detection.

At the second time after the expected time, no new anchor point detection has been made, even though the second anchor point should have been detected by the second time, hence, an error may be present.

At the third time, the second anchor point is detected. If there is a time difference between the third time and the expected time, an error may be present as the second anchor point is detected at the wrong time.

As timing errors in detecting the first and second anchor points can be determined, it is possible to use the first and second anchor point to accurately position the vehicle and/or verify vehicle positions with the use of the first and second anchor points. These positions may for example be used together with other positioning methods for the vehicle. The first and second anchor points may be arranged at positions wherein it is difficult to position the vehicle and/or where some normally used positioning methods may be unavailable.

Optionally, detecting the first anchor point and/or detecting the second anchor point comprises obtaining a reading of a radio frequency tag, or a visual marker indicating the respective anchor point.

Optionally, detecting the first anchor point and/or detecting the second anchor point comprises verifying a reading of the respective anchor point.

Optionally, detecting the first anchor point and/or detecting the second anchor point comprises obtaining a predetermined position of the respective anchor point.

Optionally, when the time difference indicates that the second time is more than a second threshold after the expected time, determining that there is an error in detecting the first anchor point and/or the second anchor point. In this way, it may be concluded that there is an error if the time difference is substantial.

Optionally, when the time difference indicates that the third time is more than a third threshold after or before the expected time, determining that there is an error in detecting the first anchor point and/or the second anchor point. In this way, it may be concluded that there is an error if the time difference is substantial.

Optionally, when determining that there is an error in detecting the first anchor point and/or the second anchor point, the method comprises triggering any one or more out of:

an emergency stop of the vehicle,
a change of mode of the vehicle,
an adjustment to a maximum speed of the vehicle, and
an activation or deactivation of a vehicle functionality of the vehicle.

Since there is an action triggered by the error, safety and/or productivity is ensured even when errors are present.

Optionally, when determining that there is no error in detecting the first anchor point and/or the second anchor point, triggering positioning of the vehicle using a predetermined position of the first anchor point and/or a predetermined position of the second anchor point.

In this way, improved positioning reliability is achieved as the predetermined position of the first anchor point and/or the predetermined position of the second anchor point may be used for positioning the vehicle.

Optionally, obtaining the speed indication comprises obtaining an expected speed of the vehicle according to a drive plan between the first anchor point and the second anchor point. In this way, it may be possible to efficiently obtain the speed indication. The expected speed of the vehicle may for example be represented by a maximum speed limit to be obeyed by the vehicle.

Optionally, obtaining the speed indication comprises obtaining the actual speed of the vehicle, and wherein the actual speed comprises a current speed and/or an average speed of the vehicle. In this way, it is possible to determine the expected time with better accuracy and thus also determining whether there is an error in detecting the first anchor point and/or the second anchor point with higher accuracy.

Optionally, the distance between the first anchor point and the second anchor point is predetermined. In this way, it is possible to determine the expected time with better accuracy and thus also determining whether there is an error in detecting the first anchor point and/or the second anchor point with higher accuracy.

According to a second aspect, there is provided a control unit to perform the method according to the first aspect. The control unit may be an electronic control unit. Advantages and effects of the control unit are largely analogous to the advantages and effects of the method. Further, all embodiments of the control unit are applicable to and combinable with all embodiments of the method, and vice versa.

According to a third aspect, there is provided an autonomous vehicle comprising the control unit according to the second aspect. The autonomous vehicle is configured to travel from a start location via a set of road segments, and to arrive at a target destination location within a time interval of a target time of arrival. Advantages and effects of the autonomous vehicle are largely analogous to the advantages and effects of the method and/or the control unit. Further, all embodiments of the vehicle are applicable to and combinable with all embodiments of the method, and vice versa.

According to a fourth aspect, there is provided a computer program comprising program code means for performing the method according to the first aspect, when said program is run on a computer. Advantages and effects of the computer program are largely analogous to the advantages and effects of the method. Further, all embodiments of the computer program are applicable to and combinable with all embodiments of the method, and vice versa.

According to a fifth aspect, there is provided a computer program medium carrying a computer program comprising program code means for performing the method according to the first aspect, when said program is run on a computer. Advantages and effects of the computer program medium are largely analogous to the advantages and effects of the method. Further, all embodiments of the computer program medium are applicable to and combinable with all embodiments of the method, and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1A:
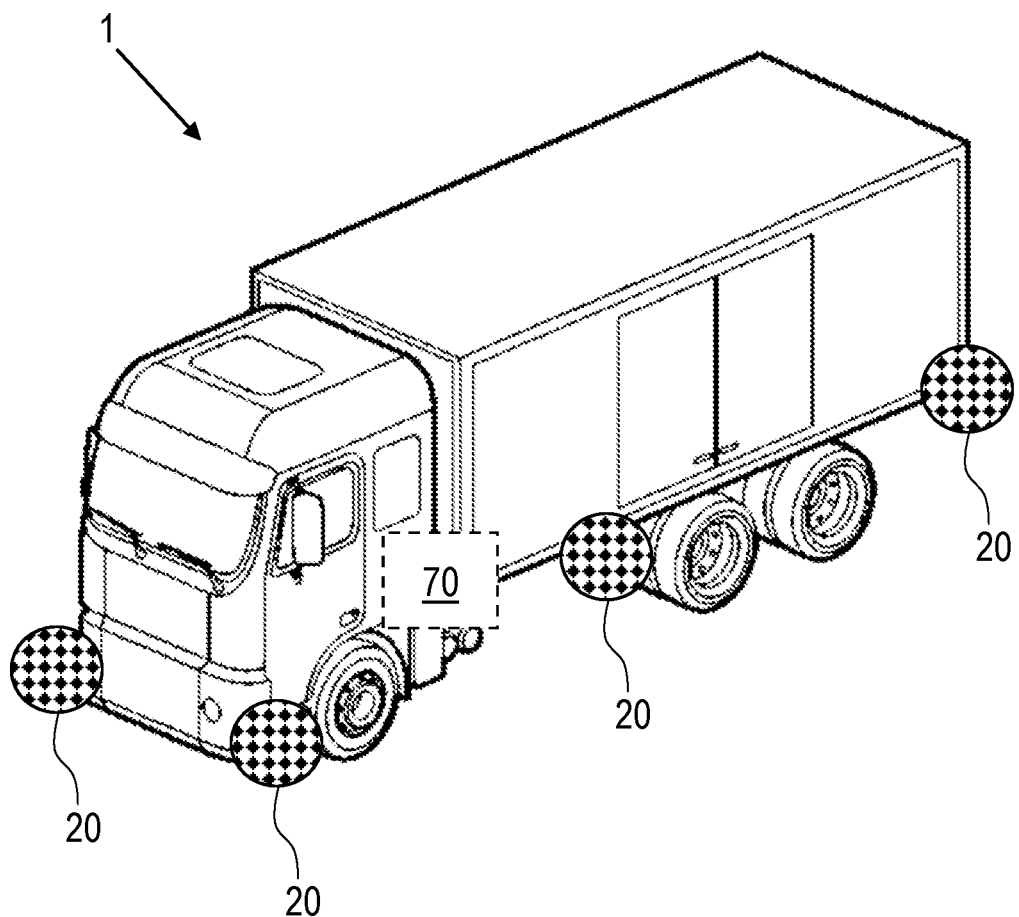
FIG. 1a Is a schematic overview of an at least partly autonomous vehicle.

FIG. 1a illustrates a schematic overview of a vehicle 1. The vehicle 1 is at least partly autonomous, i.e. there is at least some automated control of the operations of the vehicle 1, e.g. the autonomous vehicle 1 may drive without aid of a user. The vehicle 1 may be any type of vehicle, e.g. car, truck, bus, heavy-duty vehicle, or wheel loader, marine vessel etc.

The vehicle 1 comprises a set of sensors 20 for detecting anchor points. The anchor points are arranged external to the vehicle 1. The anchor points may be any detectable feature which is coupled with a predetermined position, i.e. when detecting the detectable feature. The set of sensors 20 may comprise any sensors suitable for detecting anchor points. For example, the set of sensors 20 may comprise one or more radio frequency readers for Radio Frequency Identification (RFID). When reading an RF tag, a predetermined location associated with said tag is obtained, either by first obtaining some identifier which may be used to look up the predetermined position and/or the predetermined position may be read directly from the RF tag. The set of sensors 20 may additionally or alternatively comprise one or more cameras for detection of visual markers such as QR codes. When reading a visual marker, a predetermined location associated with said visual marker is obtained, either by first obtaining some identifier which may be used to look up the predetermined position and/or the predetermined position may be read directly from the visual marker. Anchor points may typically be arranged along a road, e.g. on a side of the road or on the road. For example, visual markers may easily be detected at short and long ranges and may be arranged where they are best visible, e.g. along a side of a road. RF tags may need a short range to be detected, e.g. one meter. RF tags may be arranged on a side of a road and/or be incorporated into the road such that the vehicle 1 detects anchor points by driving directly over at least part of the RF tags. The set of sensors 20 may be arranged around the vehicle 1 at any suitable location. In some embodiments, the set of sensors 20 comprises sensors arranged under the vehicle 1 (not shown in FIG. 1a) e.g., such that visual markers and/or RF tags driven over by the vehicle 1 may be detected.

Embodiments herein may be performed by a control unit 70. The control unit 70 may be comprised in the vehicle 1 but may also be comprised in any other suitable location communicatively connected with the vehicle 1.

Figure 1B:
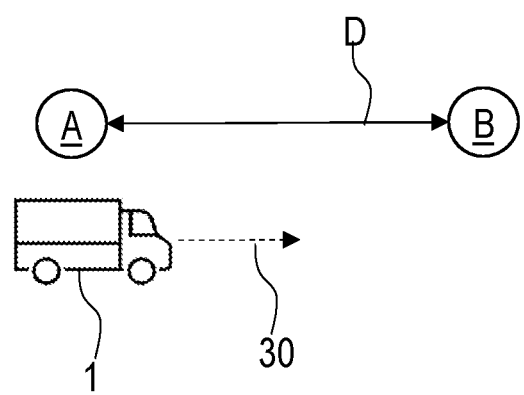
FIG. 1b Is a schematic overview of an at least partly autonomous vehicle determining an error when detecting anchor points.

FIG. 1b illustrates a schematic overview of the vehicle 1 determining errors when detecting anchor points. The vehicle 1 drives in a direction 30 and detects a first anchor point A. A distance D to a second anchor point B is obtained. Directions as used herein, e.g. horizontal, vertical, lateral, relate to when the vehicle 1 is standing on flat ground and the direction 30 is the horizontal direction. For example, the distance between A and B may be predetermined. It may further be predetermined that when detecting the first anchor point A, the second anchor point B may be the subsequent anchor point to detect. By obtaining a speed indicator of the vehicle 1, it is possible to estimate an expected time for when the vehicle 1 is to detect the second anchor point B. If the second anchor point B is not detected at the expected time, an error may have occurred. For example, there may be a bug and/or fault causing an old anchor point to be detected instead of the second anchor point B, anchor point detection of the first anchor point A and/or the second anchor point B may be slower than expected and/or required to be accurate, and/or the vehicle 1 may be present at an incorrect position at the expected time.

Figure 2:
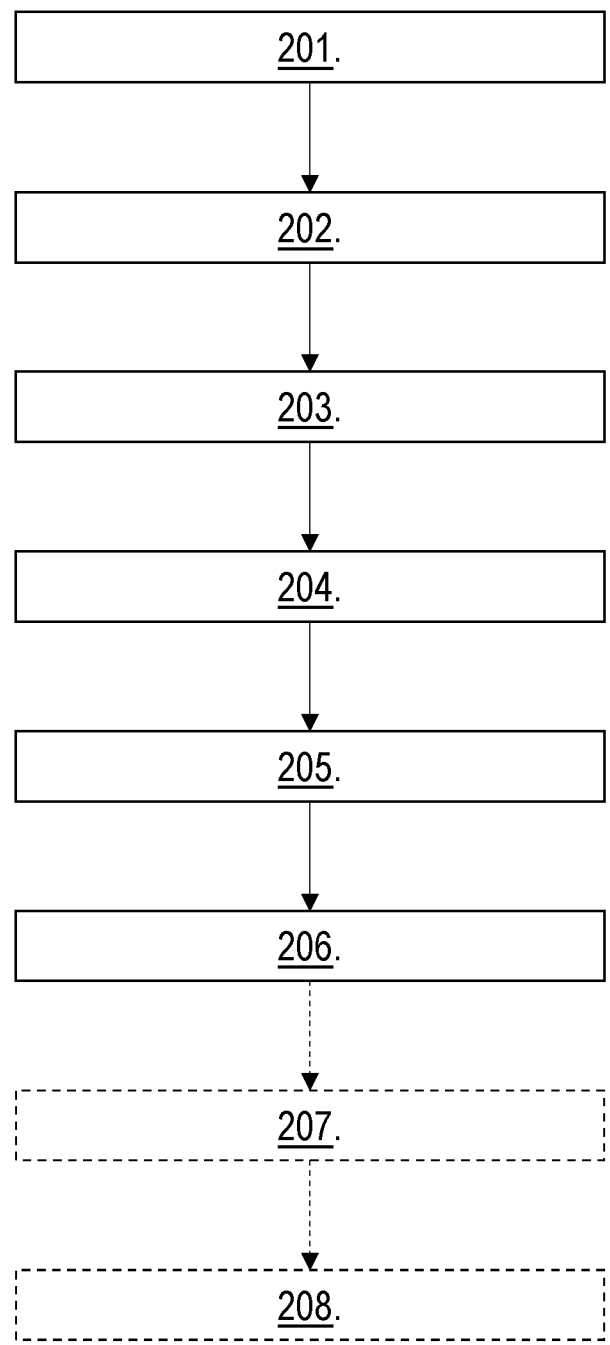
FIG. 2 is a flowchart illustrating a method.

FIG. 2 illustrates a method for determining an error with anchor point detection for the vehicle 1. The vehicle 1 is at least partly autonomous. The method may e.g. be performed by the control unit 70. The method may comprise one or more of the following actions which actions may be taken in any suitable order. Optional actions are indicated with dashed lined in FIG. 2.

Action 201

The method comprises detecting the first anchor point A at a first time.

In some embodiments, detecting the first anchor point A may comprise obtaining a reading of a radio frequency tag, or a visual marker, e.g. a QR code, indicating the anchor point A. The reading may be obtained using the set of sensors 20 of the vehicle 1.

In some embodiments, detecting the first anchor point A comprises verifying a reading of the anchor point A. This may mean that the detecting step may first indicate that there is a detected anchor point, and verifying the reading may comprise checking that the anchor point is the first anchor point A. Verifying the reading may incur a delay, e.g. as it need to be ensured that no old anchor points are detected.

In some embodiments, detecting the first anchor point A comprises obtaining a predetermined position of the first anchor point A. This may be performed e.g. by means of reading information of a radio frequency tag or visual marker, or it may be looked up in by any other suitable means.

In some embodiments, detecting the first anchor point A may comprise obtaining further information of the first anchor point A, e.g. any one or more out of: a unique identifier of the first anchor point A, the predetermined position of the first anchor point A, information of which anchor point(s) is/are to be detected after detecting the first anchor point A, position of a subsequent anchor point, e.g. the second anchor point B, and a distance to a subsequent anchor point, e.g. the second anchor point B. This may be performed e.g. by means of reading information of a radio frequency tag or visual marker, or it may be looked up in by any other suitable means. For example, the unique identifier of the first anchor point A may be used to lookup the information.

Action 202

The method comprises obtaining a distance between the first anchor point A and the second anchor point B.

In some embodiments the distance between the first anchor point A and the second anchor point B is predetermined. For example, when detecting the first anchor point A, it may be predetermined that the subsequent anchor point is the second anchor point B. The distance may or may not be obtained by detecting the first anchor point A, e.g. as explained in Action 201. In some embodiments, it may be predetermined that each subsequent anchor point is spaced with a same predetermined distance.

Action 203

The method comprises obtaining a speed indication. The speed indication indicates an actual speed and/or an expected speed of the vehicle 1 between the first anchor point A and the second anchor point B. For example, the actual speed may be a measured speed and the expected speed may be according to a plan, schedule or speed limit.

As an example, obtaining the speed indication may comprise obtaining an expected speed of the vehicle 1 according to a drive plan between the first anchor point A and the second anchor point B.

As another example, obtaining the speed indication comprises obtaining the actual speed of the vehicle 1. In these embodiments, the actual speed may comprise a current speed and/or an average speed of the vehicle 1. This may be measured e.g. by a speedometer of the vehicle 1.

Action 204

The method comprises estimating an expected time for the vehicle 1 to detect the second anchor point B. The estimation is based on the obtained distance and using the indicated actual speed and/or expected speed. For example, estimating the expected time may comprise calculating a time it takes for the vehicle 1 to travel the obtained distance in the actual speed or in the expected speed, or some derivation thereof. Thus, the expected time may be the first time, e.g. as obtained in Action 201, added with a calculated time it should take for the vehicle 1 to travel between the predetermined position of the first anchor point A and the predetermined position of the second anchor point B.

In some embodiments the expected time is a relative time until the second anchor point B should be detected. In other words the expected time may indicate that the second anchor point B should be detected in a certain amount of seconds. In some embodiments the expected time is an absolute time, e.g. with reference to a clock in the vehicle 1.

Action 205

The method comprises establishing a time difference by any one out of the following options 1) and 2):

Option 1) at a second time after the expected time, establishing the time difference by comparing the expected time with the second time, or Option 2) detecting the second anchor point B at a third time, and establishing the time difference by comparing the expected time with the third time.

In some embodiments, detecting the second anchor point B comprises obtaining a reading of a radio frequency tag, or a visual marker indicating the second anchor point B, e.g. similar to detecting the first anchor point A in actions 201.

In some embodiments, detecting the second anchor point B comprises verifying a reading of the second anchor point B, e.g. similar to detecting the first anchor point A in actions 201.

In some embodiments, detecting the second anchor point B comprises obtaining a predetermined position of the second anchor point B, e.g. similar to detecting the first anchor point A in actions 201.

In the above first option 1), at the second time after the expected time, no new anchor point detection has been made, even though the second anchor point should have been detected by the second time, hence, an error may be present. The second time is at a time after the second anchor point B should have been detected. In other words, the time difference of the first option 1) indicates how late is a potential detection of the second anchor point B. If the detection is late, an error may have occurred otherwise the second anchor point B would be detected at the expected time.

In the above second option 2), at the third time, the second anchor point is detected. If there is a time difference between the third time and the expected time, an error may be present as the second anchor point B is detected at the wrong time, e.g. earlier or later than the expected time. Option 2) may also be possible to detect an error if any other anchor point is detected, e.g. the first anchor point A or a third anchor point. This is since the time difference still indicates an error in how anchor points should be detected.

Timing errors may occur for many reasons, e.g. since old anchor points may be wrongly detected, there may be delay in detecting anchor points, e.g. when verifying the anchor points, etc. Other timing errors may be due to any one or more out of: missed readings of anchor points, software errors, communication bus overload, etc. Thus the second anchor point B may not always be detected at the expected time. Therefore the established time difference may indicate how long since the second anchor point B should have been detected, or a timing error of a time when detecting the second anchor point B.

Action 206

The method comprises determining whether there is an error in detecting the first anchor point A and/or the second anchor point B based on the established time difference. This is possible as the established time difference is a time since the second anchor point B should have been detected. For example, the time difference may indicate an error in detecting the first anchor point A and/or the second anchor point B if the time difference is non-zero, or if the time difference is above a threshold. Determining whether there is an error may be performed continuously and/or be triggered by an event, e.g. detecting any anchor point.

In some embodiments, the method comprises: when the time difference indicates that the second time is more than a second threshold after the expected time, determining that there is an error in detecting the first anchor point A and/or the second anchor point B. In other words, some delay may be acceptable, e.g. due to error margins, but if the delay, i.e. the time difference is too large, it is considered an error in the anchor point detection of the first anchor point A and/or the second anchor point B.

In some embodiments, the method comprises; when the time difference indicates that the third time is more than a third threshold after or before the expected time, determining that there is an error in detecting the first anchor point A and/or the second anchor point B. For some embodiments, this may mean that the second anchor point B needs to be detected within an interval of time of the expected time to be considered a valid anchor point detection. As an example, when the first anchor point A is detected, and the second anchor point B is X meter in distance away from the first anchor point A, and the vehicle 1 is driving Y meters per second, the second anchor point B should be detected within X/Y seconds and account for some error margins as a time interval being a percentage of the X/Y seconds, e.g. 10%. In this example, the second anchor point B needs to be detected within X/Y+−0.1*X/Y seconds. To further exemplify, X may be a distance of 10 meters, and Y may be a velocity of 5 meters per seconds making the expected time to detect the second anchor point B to be in 2 seconds. Thus, in this example, the second anchor point B may need to be detected in an interval of 1.8 seconds to 2.2 seconds, to be considered a valid anchor point detection.

In other words, some time difference in detecting the second anchor point B may be acceptable, e.g. due to error margins, but if the time difference is too large, it is considered an error in the anchor point detection of the first anchor point A and/or the second anchor point B.

In some of the embodiments, it may be possible to determine which of the first anchor point A and the second anchor point B has a detection error. However, sometimes it may only be possible to determine that there exists a timing error in the anchor point detections, and hence, there is an error relating to detecting any one or both of the first anchor point A and the second anchor point B. In any case, determining that there is any error present is enough to take preventive action to ensure that the vehicle 1 is not relying on or waiting for erroneous positioning data.

Additionally or alternatively, it may further be possible to determine that there is an error in detecting the first anchor point A and/or the second anchor point B if a wrong anchor point is detected or if anchor points are detected in a wrong order. For example if anchor point B is detected before anchor point A then an error may be present.

Action 207

In some embodiments, the method comprises: when determining that there is an error in detecting the first anchor point A and/or the second anchor point B, triggering 207 any one or more out of:

an emergency stop of the vehicle 1, a change of mode of the vehicle 1, e.g., a safe mode with higher safety restrictions an adjustment to a maximum speed of the vehicle 1, and an activation or deactivation of a vehicle functionality of the vehicle 1.

Since any of the actions may be triggered by the error, safety and/or productivity of the vehicle 1 is ensured even when an error is present.

Action 208

In some embodiments, the method comprises: when determining that there is no error in detecting the first anchor point A and/or the second anchor point B, triggering positioning of the vehicle 1 using the predetermined position of the first anchor point A and/or the predetermined position of the second anchor point B.

In this way, improved positioning reliability is achieved as the predetermined position of the first anchor point and/or the predetermined position of the second anchor point may be used for positioning the vehicle 1 reliably. The predetermined positions of the respective anchor points may be used to verify other positioning measurements, e.g. using GPS, Lidar, cameras, dead reckoning, etc.

Besides position of the vehicle, it follows that an actual speed and direction of the vehicle 1, is implicitly verified i.e., as obtainable by the predetermined positions and time of detections of the detected first anchor point A and the second anchor point B. FIG. 3a-3d illustrates example scenarios of how anchor points may be arranged. The embodiments discussed in the scenarios may be combined in any suitable manner.

Figure 3A:
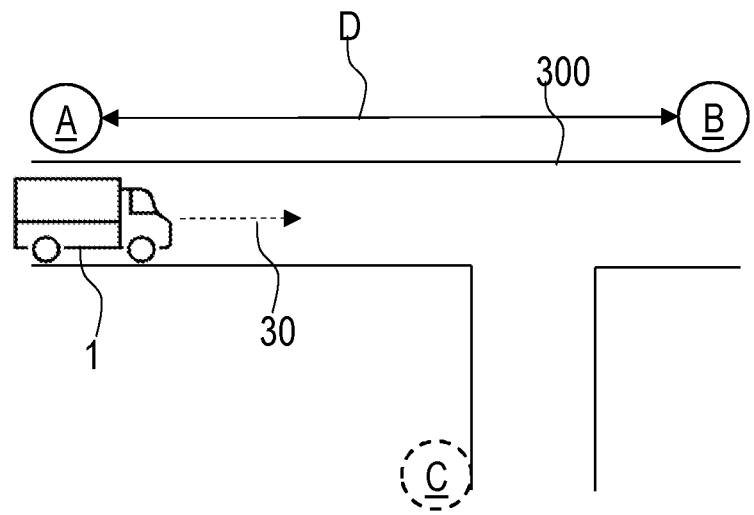
FIG. 3a-d are a schematic block diagrams illustrating example arrangements of anchor points.

FIG. 3a illustrates an example scenario where the vehicle 1 is traveling in the direction 30 on a road 300. The first anchor point A and the second anchor point B is arranged at a side of the road 300. Additionally, a third anchor point C may be present. In these scenarios, if the third anchor point C is detected at any point when anchor point A or B should be detected, it may be determined that there is an error. As an alternative the third anchor point C may also be used as a subsequent anchor of the first anchor point A when the vehicle 1 is configured to turn in the road 300. For those configurations, the same actions 201-208 would apply for the relationship between the first anchor point A and the third anchor point C instead of the relationship between the first anchor point A and the second anchor point B. In these scenarios, the set of sensors 20 of the vehicle 1 may comprise sensors arranged on the side of the vehicle 1 such that the set of sensors 20 are capable of detecting the anchor points A, B, C.

Figure 3B:
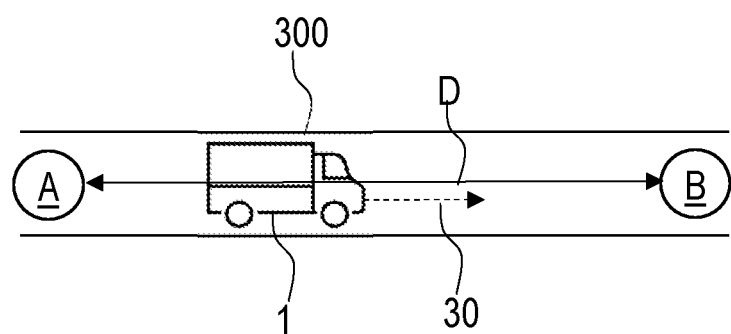

FIG. 3b illustrates an example scenario where the vehicle 1 is traveling in the direction 30 on the road 300. The first anchor point A and the second anchor point B is in the road 300, e.g. in the middle of the road 300. The first anchor point A and the second anchor point B may for example be RF tags incorporated in the material of the road 300 such that they are detected when the vehicle 1 is driving above respective anchor points. In this example scenario, the set of sensors 20 of the vehicle 1 may comprise sensors arranged on the bottom side of the vehicle 1 such that the set of sensors 20 are capable of detecting first anchor point A and the second anchor point B.

Figure 3C:
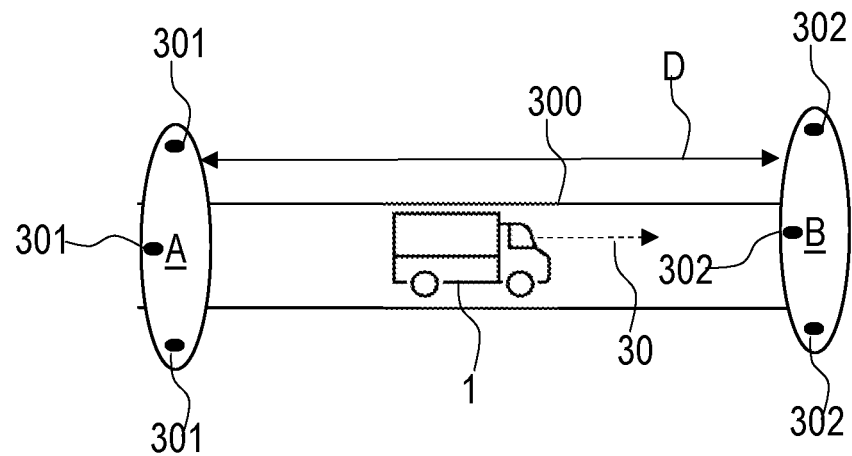

FIG. 3c illustrates an example scenario where the vehicle 1 is traveling in the direction 30 on the road 300. The first anchor point A comprises a first set of RF tags 301. The first set of RF tags 301 may be arranged on one or more sides of the road 300 and/or in the road 300, e.g. as in any one or both of exampled of FIGS. 3a-3b. The first anchor point A may be detected when any one or more out of the first set of RF tags 301 is read by one or more sensors in the set of sensors 20. The second anchor point B comprises a second set of RF tags 302. The second set of RF tags 302 may be arranged on one or more sides of the road 300 and/or in the road 300, e.g. as in any one or both of the examples of FIGS. 3a-3b. The second anchor point B may be detected when any one or more out of the second set of RF tags 302 is read by one or more sensors in the set of sensors 20. In this scenario, the set of sensors 20 of the vehicle 1 may comprise sensors arranged on any one or more side of the vehicle 1 e.g. as in any one or both of the examples of FIGS. 3a-3b, such that the set of sensors 20 is capable of detecting first anchor point A and the second anchor point B.

Figure 3D:
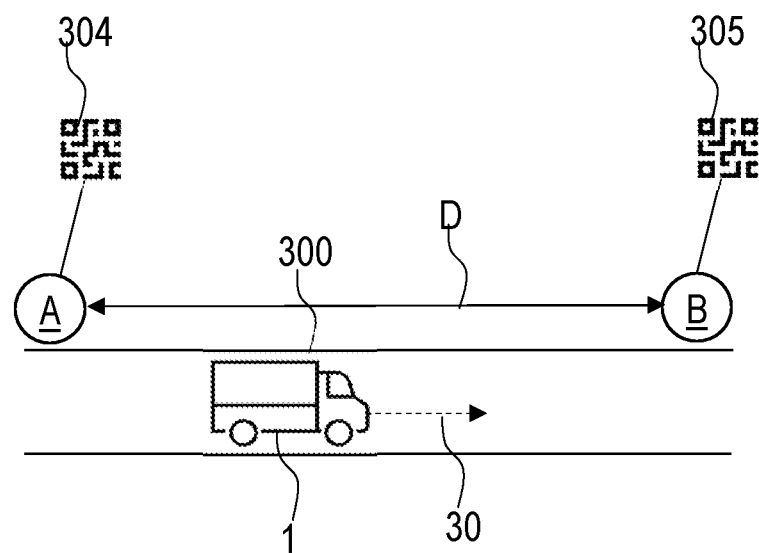

FIG. 3d illustrates an example scenario where the vehicle 1 is traveling in the direction 30 on the road 300. The first anchor point A may comprise a first visual marker 304 consisting of a corresponding QR code. The first anchor point B may comprise a second visual marker 305 consisting of a corresponding QR code. The first anchor point A may be detected when the first visual marker 304 is read by one or more sensors in the set of sensors 20. The second anchor point B may be detected when the second visual marker 305 is read by one or more sensors in the set of sensors 20. In this scenario, the set of sensors 20 of the vehicle 1 may comprise cameras e.g., arranged on any one or more side of the vehicle 1 such that the set of sensors 20 is capable of detecting first anchor point A and the second anchor point B.

To perform the method actions described herein, the control unit 70 may be configured to determine an error with anchor point detection for the vehicle 1. The control unit 70 may further be configured to perform any one or more of the above actions 201-208 or any of the other examples and/or embodiments herein. The control unit 70 may be comprised in any suitable location such as e.g. the vehicle 1. The control unit 70 may for example comprise an arrangement depicted in FIGS. 4a and 4b.

The control unit 70 may comprise an input and output interface 400 configured to communicate with any necessary components and/or entities of embodiments herein. The input and output interface 400 may comprise a wireless and/or wired receiver (not shown) and a wireless and/or wired transmitter (not shown). The control unit 70 may be arranged in any suitable location of the vehicle 1. The control unit 70 may use the input and output interface 400 to control and communicate with sensors, e.g. the set of sensors 20, actuators, subsystems, and interfaces in the vehicle 1 by using any one or more out of: Controller Area Network (CAN), ethernet cables, Wi-Fi, Bluetooth, and/or other network interfaces.

The control unit 70 may be configured to, e.g. by means of a detecting unit 401 in the control unit 70, detect, the first anchor point A at a first time.

The control unit 70 may be configured to, e.g. by means of an obtaining unit 402 in the control unit 70, obtain, a distance between the first anchor point A, and the second anchor point B.

The control unit 70 may be configured to, e.g. by means of the obtaining unit 402 in the control unit 70, obtain, a speed indication, wherein the speed indication indicates an actual speed and/or an expected speed of the vehicle 1 between the first anchor point A and the second anchor point B.

The control unit 70 may be configured to, e.g. by means of the obtaining unit 402 in the control unit 70, obtain the speed indication by obtaining an expected speed of the vehicle 1 according to a drive plan between the first anchor point A and the second anchor point B. The control unit 70 may be configured to, e.g. by means of the obtaining unit 402 in the control unit 70, obtain the speed indication by obtaining the actual speed of the vehicle 1, and wherein the actual speed comprises a current speed and/or an average speed of the vehicle 1.

The control unit 70 may be configured to, e.g. by means of an estimating unit 403 in the control unit 70, based on the obtained distance and using the indicated actual speed and/or expected speed, estimate an expected time for the vehicle 1 to detect the second anchor point B.

The control unit 70 may be configured to, e.g. by means of an establishing unit 404 in the control unit 70, establish a time difference by any one out of:
- at a second time after the expected time, establishing the time difference by comparing the expected time with the second time, or
- detecting the second anchor point B at a third time, and establishing the time difference by comparing the expected time with the third time.

The control unit 70 may be configured to, e.g. by means of a determining unit 405 in the control unit 70, based on the established time difference, determine whether there is an error in detecting the first anchor point A and/or the second anchor point B.

The control unit 70 may be configured to, e.g. by means of the determining unit 405 in the control unit 70, when the time difference indicates that the second time is more than a second threshold after the expected time, determine that there is an error in detecting the first anchor point A and/or the second anchor point B.

The control unit 70 may be configured to, e.g. by means of the determining unit 405 in the control unit 70, when the time difference indicates that the third time is more than a third threshold after or before the expected time, determine that there is an error in detecting the first anchor point A and/or the second anchor point B.

The control unit 70 may be configured to, e.g. by means of a triggering unit 406 in the control unit 70, trigger any one or more out of: an emergency stop of the vehicle 1, a change of mode of the vehicle 1, an adjustment to a maximum speed of the vehicle 1, and an activation or deactivation of a vehicle functionality of the vehicle 1. This may be triggered by the control unit 70 when determining that there is an error in detecting the first anchor point A and/or the second anchor point B.

The control unit 70 may be configured to, e.g. by means of the triggering unit 406 in the control unit 70, trigger positioning of the vehicle 1 using a predetermined position of the first anchor point A and/or a predetermined position of the second anchor point B. This may be triggered by the control unit 70 when determining that there is no error in detecting the first anchor point A and/or the second anchor point B.

Figure 4A:
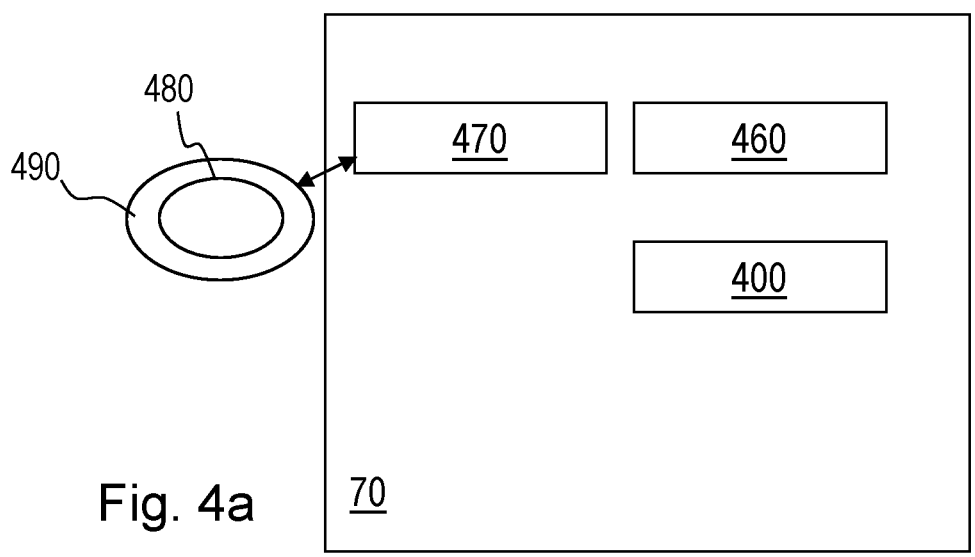
FIGS. 4a-4b are schematic block diagrams illustrating a control unit.
Figure 4B:
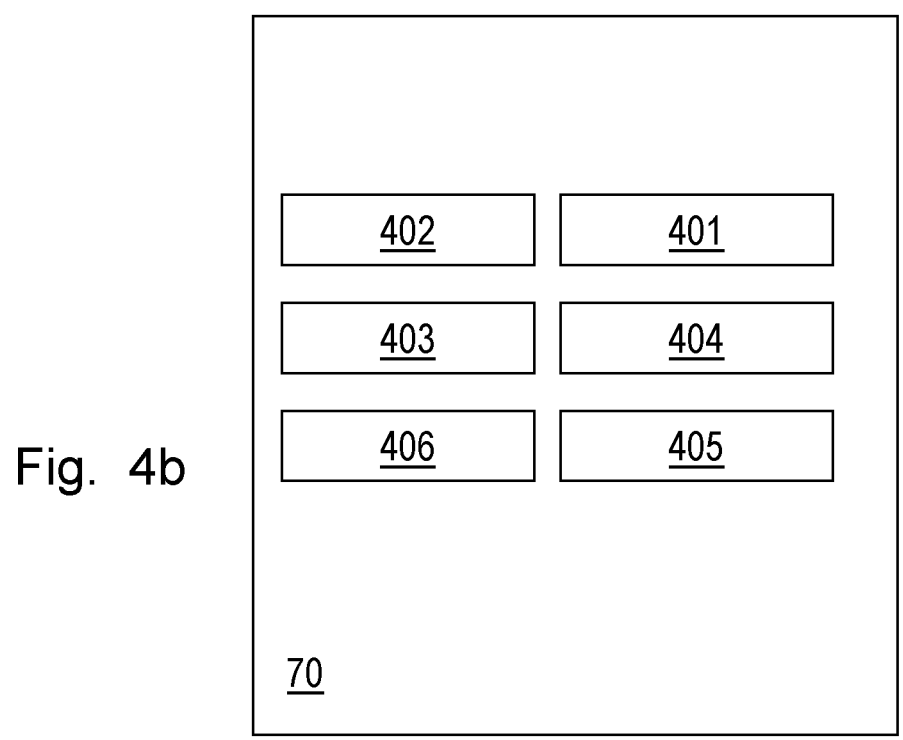

The embodiments herein may be implemented through a processor or one or more processors, such as the processor 460 of a processing circuitry in the control unit 70 depicted in FIG. 4a, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 470 comprising one or more memory units. The memory 470 comprises instructions executable by the processor in control unit 70. The memory 470 is arranged to be used to store e.g. information, indications, data, configurations, sensor data, positioning information, and applications to perform the methods herein when being executed in the control unit 70.

In some embodiments, a computer program 480 comprises instructions, which when executed by a computer, e.g. the at least one processor 460, cause the at least one processor of the control unit 70 to perform the actions 201-208 above.

In some embodiments, a computer-readable storage medium 490 comprises the respective computer program 480. The computer-readable storage medium 490 may comprise program code for performing the steps of any one of actions 201-208 above when said program product is run on a computer, e.g. the at least one processor 460.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

The invention claimed is:

1. A method for determining an error with anchor point detection for a vehicle, wherein the vehicle is at least partly autonomous, the method comprising:
   - detecting a first anchor point at a first time;
   - obtaining a distance between the first anchor point, and a second anchor point;
   - obtaining a speed indication, wherein the speed indication indicates an actual speed and/or an expected speed of the vehicle between the first anchor point and the second anchor point;
   - based on the obtained distance and using the indicated actual speed and/or expected speed, estimating an expected time for the vehicle to detect the second anchor point;
   - establishing a time difference by:
   - detecting the second anchor point at a third time, and establishing the time difference by comparing the expected time with the third time; and
   - based on the established time difference, determining whether there is an error in detecting the first anchor point and/or the second anchor point.

2. A method according to claim 1, wherein detecting the first anchor point and/or detecting the second anchor point comprises obtaining a reading of a radio frequency tag, or a visual marker indicating the respective anchor point.

3. A method according to claim 1, wherein detecting the first anchor point and/or detecting the second anchor point comprises verifying a reading of the respective anchor point.

4. A method according to claim 1, wherein detecting the first anchor point and/or detecting the second anchor point comprises obtaining a predetermined position of the respective anchor point.

5. A method according to claim 1, when the time difference indicates that the third time is more than a third threshold after or before the expected time, determining that there is an error in detecting the first anchor point and/or the second anchor point.

6. A method according to claim 1, further comprising, when determining that there is an error in detecting the first anchor point and/or the second anchor point, triggering any one or more out of:
- an emergency stop of the vehicle,
- a different mode of the vehicle,
- an adjustment to a maximum speed of the vehicle, and
- an activation or deactivation of a vehicle functionality of the vehicle.

7. A method according to claim 1, further comprising, when determining that there is no error in detecting the first anchor point and/or the second anchor point, triggering positioning of the vehicle using a predetermined position of the first anchor point and/or a predetermined position of the second anchor point.

8. A method according to claim 1, wherein obtaining the speed indication comprises obtaining the expected speed of the vehicle according to a drive plan between the first anchor point and the second anchor point.

9. A method according to claim 1, wherein obtaining the speed indication comprises obtaining the actual speed of the vehicle, and wherein the actual speed comprises a current speed and/or an average speed of the vehicle.

10. A method according to claim 1, wherein the distance between the first anchor point and the second anchor point is predetermined.

11. A control unit configured to perform the method according to claim 1.

12. A vehicle comprising the control unit according to claim 11, wherein the vehicle is at least partly autonomous.

13. A non-transitory computer program medium carrying a computer program comprising program code for performing the steps of claim 1 when said program code is run on a computer.

* * * * *